US012601509B2

(12) United States Patent
Kim

(10) Patent No.: US 12,601,509 B2
(45) Date of Patent: Apr. 14, 2026

(54) MULTI-STAGE DEHUMIDIFICATION SYSTEM FOR LOCAL AREA DEHUMIDIFICATION OF DRY ROOM

(71) Applicant: CK Solution Co., Ltd., Yongin-si (KR)

(72) Inventor: Yu Gon Kim, Yongin-si (KR)

(73) Assignee: CK Solution Co., Ltd., Yongin-si (KR)

( * ) Notice: Subject to any disclaimer, the term of this patent is extended or adjusted under 35 U.S.C. 154(b) by 636 days.

(21) Appl. No.: 17/663,799

(22) Filed: May 17, 2022

(65) Prior Publication Data

US 2022/0373199 A1 Nov. 24, 2022

(30) Foreign Application Priority Data

May 21, 2021 (KR) ........................ 10-2021-0065423

(51) Int. Cl.
*F24F 9/00* (2006.01)
*B01D 53/26* (2006.01)
*F24F 3/14* (2006.01)
(52) U.S. Cl.
CPC ................ *F24F 3/14* (2013.01); *B01D 53/26* (2013.01); *F24F 9/00* (2013.01); *F24F 2003/144* (2013.01); *F24F 2009/002* (2013.01)
(58) Field of Classification Search
CPC .......... F24F 3/14; F24F 9/00; F24F 2003/144; F24F 2009/002; F24F 3/167; B01D 53/26; Y02E 60/10
See application file for complete search history.

(56) References Cited

U.S. PATENT DOCUMENTS

| | | | | |
|---|---|---|---|---|
| 2,020,194 | A | * | 11/1935 | Kiel ........................ F16L 41/02 |
| | | | | 126/307 R |
| 3,049,984 | A | * | 8/1962 | Boysen ............... F24F 13/1486 |
| | | | | 454/192 |

(Continued)

FOREIGN PATENT DOCUMENTS

| | | |
|---|---|---|
| JP | 2562305 Y2 | 10/1997 |
| JP | 2016-114255 A | 6/2016 |

(Continued)

OTHER PUBLICATIONS

Office Action dated Jul. 13, 2021 in Korean Application No. 10-2021-0065423.

*Primary Examiner* — Dung H Bui
(74) *Attorney, Agent, or Firm* — Saliwanchik, Lloyd & Eisenschenk

(57) ABSTRACT

The present disclosure relates to a multi-stage dehumidification system for local area dehumidification of dry room, the system including a main dehumidification part formed to have an inside space that is sealed from outside; a main dehumidifying device for controlling that the relative humidity of the inside of the main dehumidification part is smaller than the relative humidity of the outside of the main dehumidification part; at least one local area dehumidification part that is partitioned within the main dehumidification part, and that has an inside space that is sealed from the main dehumidification part; and a local area dehumidifying device for controlling that the relative humidity of the inside of the local area dehumidification part is smaller than the relative humidity of the inside of the main dehumidification part, wherein the local area dehumidification part includes an opening for entry and exit of objects; a moisture penetration prevention part that protrudes to outside from an edge of the opening; and a first air curtain part that forms a first blocking (Continued)

air flow from one side of an outer opening of the moisture penetration prevention part towards the other side.

6 Claims, 11 Drawing Sheets

(56) References Cited

U.S. PATENT DOCUMENTS

| | | | | |
|---|---|---|---|---|
| 3,068,775 | A * | 12/1962 | Zehnder | F24F 9/00 |
| | | | | 454/192 |
| 3,304,736 | A * | 2/1967 | Brennan | A47F 3/0447 |
| | | | | 454/193 |
| 3,582,051 | A * | 6/1971 | Klein | B01D 47/06 |
| | | | | 261/126 |
| 3,608,468 | A * | 9/1971 | McClurkin | F24F 9/00 |
| | | | | 454/192 |
| 3,648,482 | A * | 3/1972 | Beckwith | A47F 3/0447 |
| | | | | 62/272 |
| 3,800,946 | A * | 4/1974 | Reid | B04C 5/103 |
| | | | | 209/733 |
| 3,951,620 | A * | 4/1976 | Frischmuth, Jr. | B01D 45/12 |
| | | | | 95/271 |
| 4,302,946 | A * | 12/1981 | Ibrahim | F25D 21/12 |
| | | | | 62/282 |
| 4,633,677 | A * | 1/1987 | Maehara | A47F 3/0447 |
| | | | | 62/256 |
| 4,967,645 | A * | 11/1990 | Mattson | F24F 9/00 |
| | | | | 454/305 |
| 5,453,077 | A * | 9/1995 | Donnelly | G05D 23/1917 |
| | | | | 600/22 |
| 5,759,149 | A * | 6/1998 | Goldberg | F24F 11/523 |
| | | | | 600/22 |
| 6,027,337 | A * | 2/2000 | Rogers | D01F 9/32 |
| | | | | 432/64 |
| 6,232,015 | B1 * | 5/2001 | Wyser | H01M 10/0431 |
| | | | | 429/94 |
| 6,375,562 | B1 * | 4/2002 | Hein | E06B 3/903 |
| | | | | 49/31 |
| 6,565,035 | B1 * | 5/2003 | Kim | B64D 13/00 |
| | | | | 454/192 |
| 7,040,978 | B2 * | 5/2006 | Falk | E06B 7/00 |
| | | | | 454/189 |
| 11,700,958 | B2 * | 7/2023 | Kurmlavage | A47F 3/0447 |
| | | | | 55/385.7 |
| 2006/0196658 | A1 * | 9/2006 | Belcher | E21B 17/22 |
| | | | | 166/244.1 |
| 2006/0199497 | A1 * | 9/2006 | Smith | F24F 9/00 |
| | | | | 454/173 |
| 2012/0117929 | A1 * | 5/2012 | Jansen | F23M 9/08 |
| | | | | 428/222 |
| 2014/0260374 | A1 * | 9/2014 | Anderson | A47F 3/0447 |
| | | | | 62/96 |
| 2015/0024671 | A1 * | 1/2015 | Taniyama | H01L 21/67772 |
| | | | | 454/193 |
| 2016/0146485 | A1 * | 5/2016 | Weening | F24F 11/76 |
| | | | | 454/188 |
| 2016/0209645 | A1 * | 7/2016 | Britton | E21B 47/017 |
| 2016/0229277 | A1 * | 8/2016 | Le Bastard | B60J 9/04 |
| 2017/0146255 | A1 * | 5/2017 | Smith | F25D 23/023 |
| 2017/0203636 | A1 * | 7/2017 | Good | B60H 1/247 |
| 2017/0227244 | A1 * | 8/2017 | Thomas, Jr. | F24F 11/62 |
| 2018/0023825 | A1 * | 1/2018 | Cuaderno | F24F 11/62 |
| | | | | 454/192 |
| 2018/0066865 | A1 * | 3/2018 | Saisu | F24F 13/222 |
| 2018/0243761 | A1 * | 8/2018 | Hashimoto | B04C 3/00 |
| 2018/0244566 | A1 * | 8/2018 | Hamilton | C03C 17/002 |
| 2018/0328610 | A1 * | 11/2018 | Dube | F24F 9/00 |
| 2019/0174915 | A1 * | 6/2019 | Prince | F24F 9/00 |
| 2019/0329284 | A1 * | 10/2019 | Saito | B05C 11/10 |
| 2020/0140093 | A1 * | 5/2020 | Vandyke | F24F 9/00 |
| 2020/0154609 | A1 * | 5/2020 | Nave | H05K 7/20172 |
| 2020/0173445 | A1 * | 6/2020 | Kono | F04D 27/003 |
| 2020/0181773 | A1 * | 6/2020 | Zhang | B05B 1/10 |
| 2020/0256570 | A1 * | 8/2020 | Kondo | F24F 9/00 |
| 2021/0025607 | A1 * | 1/2021 | Torres | B08B 15/02 |
| 2021/0300153 | A1 * | 9/2021 | Porter | B60H 3/0608 |
| 2022/0010988 | A1 * | 1/2022 | Cash | F24F 3/16 |
| 2022/0084851 | A1 * | 3/2022 | Wang | G05B 19/4184 |
| 2022/0160926 | A1 * | 5/2022 | Blate | A61L 9/22 |
| 2022/0163223 | A1 * | 5/2022 | Suetsugu | F24F 7/06 |
| 2022/0186971 | A1 * | 6/2022 | Kim | F24F 9/00 |
| 2022/0237968 | A1 * | 7/2022 | Kim | B65G 69/287 |
| 2022/0293447 | A1 * | 9/2022 | Shiu | H01L 21/67017 |
| 2023/0194106 | A1 * | 6/2023 | Leezer | F24F 11/86 |
| | | | | 236/44 A |
| 2023/0349574 | A1 * | 11/2023 | Wu | F24F 9/00 |

FOREIGN PATENT DOCUMENTS

| | | | |
|---|---|---|---|
| KR | 10-2009-0058442 | A | 6/2009 |
| KR | 10-1450199 | B1 | 10/2014 |
| KR | 101611138 | B1 * | 4/2016 |
| KR | 10-1718993 | B1 | 3/2017 |
| KR | 10-1932691 | B1 | 12/2018 |

* cited by examiner (INSIDE)                                    (OUTSIDE)

MULTI-STAGE DEHUMIDIFICATION SYSTEM FOR LOCAL AREA DEHUMIDIFICATION OF DRY ROOM

CROSS-REFERENCE TO RELATED APPLICATION

This application claims the benefit of Korean Application No. 10-2021-0065423, filed May 21, 2021, which is hereby incorporated by reference in its entirety.

FIELD

The present disclosure relates to a multi-stage dehumidification system for local area dehumidification of dry room, and more particularly, to a multi-stage dehumidification system for local area dehumidification of dry room, that is capable of locally dehumidifying only a manufacturing facility installed in the dry room or an area that requires local area dehumidification, and that is capable of effectively maintaining the relative humidity of the local area dehumidification part even when an opening of the local area dehumidification part is opened.

BACKGROUND

Recently, as the prices of energy sources increase due to the depletion of fossil fuels and the interest in environmental pollution is amplified, the demand for environmentally friendly alternative energy sources has become an indispensable factor for future life.

In particular, as technology development and demand for mobile devices increase, demand for secondary batteries as an energy source is rapidly increasing, and as a power source for electric vehicles (EVs), hybrid electric vehicles (HEVs), etc., demand for larger standardized secondary batteries is increasing.

Of the secondary batteries, lithium secondary battery using lithium ions (Li+) has advantages such as high energy density and output density, high operating voltage, high charge/discharge efficiency, and low self-discharge rate.

These lithium secondary batteries are classified into cylindrical batteries and prismatic batteries, and pouch batteries, according to the shape of the battery case. The cylindrical batteries and prismatic batteries have electrode assemblies embedded in cylindrical or prismatic metal cans, whereas the pouch batteries have electrode assemblies embedded in pouch-shaped cases made of aluminum laminate sheet.

Further, lithium secondary batteries are classified into lithium ion secondary batteries, lithium ion polymer batteries, and lithium polymer batteries, according to electrolytes.

These lithium secondary batteries are generally manufactured in three steps: an electrode process consisting of an active material mixing process, an electrode coating process, a rolling process and a slitting process; an assembly process consisting of a winding process (or lamination and depositing process), an electrode assembly receiving process and an electrolyte injection process; and a chemical conversion process consisting of an activation process, a bad battery removing process and a volume screening process, wherein the assembly process is carried out in a dry room with controlled temperature and relative humidity in order to avoid contact with moisture.

Here, the electrode process and the chemical conversion process should be carried out at a relative humidity of approximately 3.6% to 25%, and the assembly process should be carried out at a relative humidity of less than 1%.

Especially, only when the relative humidity is precisely controlled to less than 1% can the risk of the lithium component in the lithium secondary battery reacting with moisture to cause ignition in the assembly process be minimized.

FIG. 1 is a schematic view of a conventional dehumidification system of dry room. Referring to FIG. 1, the conventional dehumidification system of dry room 100 consists of a dry room 110 formed such that its inside is sealed from its outside by panels, and a dehumidification apparatus 120 formed such that the inside of the dry room 110 has a relative humidity of less than 1%.

Manufacturing facilities 101 for performing various processes are installed inside the dry room 100. Here, the manufacturing facilities 101 include both manufacturing facilities that require an environment of less than 1% of relative humidity and manufacturing facilities that require an environment having a relative humidity exceeding 1%.

However, there was a problem that a lot of unnecessary cost consumption occurs because all manufacturing facilities that do not have to maintain a humidity of less than 1%, such as the conventional dry room 100, have to be controlled to have a humidity of less than 1%.

In addition, another problem is that the area that needs to be controlled to have a humidity of less than 1% increased, and thus precise control became difficult.

PRIOR ART LITERATURE

Patent Literature (PATENT LITERATURE 1) Laid-open Patent No. 1997-0054660 "DRYROOM APPARATUS USING INERT GAS"

(PATENT LITERATURE 2) Laid-open Patent No, 2002-0057875 "DRYROOM CONTROL APPARATUS"

SUMMARY

Therefore, a purpose of the present disclosure is to resolve the problems of prior art, that is, to provide a multi-stage dehumidification system for local area dehumidification of dry room, where the inside of the dry room is divided into multi-stages for dehumidification such that only the necessary area may be locally controlled to have a humidity of less than 1%, and that is capable of effectively maintaining the relative humidity of the local area dehumidification area even when the opening of the local area dehumidification area is opened.

In addition, another purpose of the present disclosure is to provide a multi-stage dehumidification system for local area dehumidification of dry room, that is capable of dehumidifying the inside of the dry room appropriately for each process, thereby reducing unnecessary control costs.

In addition, another purpose of the present disclosure is to provide a multi-stage dehumidification system for local area dehumidification of dry room, where the area to be controlled to have a humidity of less than 1% is minimized, thereby enabling precise control.

In addition, another purpose of the present disclosure is to provide a multi-stage dehumidification system for local area dehumidification of dry room, that has a local area dehumidification part blocked from outside by multi-stages, with a relative humidity of less than 1%, thereby reducing rapid environmental changes when an operator enters and exits the room.

In addition, another purpose of the present disclosure is to provide a multi-stage dehumidification system for local area dehumidification of dry room, that has a moisture penetration prevention part installed in the opening of the local area dehumidification part to inhibit moisture from outside from penetrating inside through the opening, and an improved moisture prevention function of the moisture penetration prevention part so that the extension length of the moisture penetration prevention part can be reduced, thereby minimizing the gap between the manufacturing facilities.

The aforementioned purposes are achieved by a multi-stage dehumidification system for local area dehumidification of dry room, the system including a main dehumidification part formed to have an inside space that is sealed from outside; a main dehumidifying device for controlling the relative humidity of the inside of the main dehumidification part to be smaller than the relative humidity of the outside of the main dehumidification part; at least one local area dehumidification part that is partitioned within the main dehumidification part, and that has an inside space that is sealed from the main dehumidification part; and a local area dehumidifying device for controlling the relative humidity of the inside of the local area dehumidification part to be smaller than the relative humidity of the inside of the main dehumidification part, wherein the local area dehumidification part includes an opening for entry and exit of objects; a moisture penetration prevention part that protrudes to outside from an edge of the opening; and a first air curtain part that forms a first blocking air flow from one side of an outer opening of the moisture penetration prevention part towards the other side.

Here, it is preferable that the local area dehumidification part further includes a second air curtain part that is disposed close to outside of the first air curtain part, and forms a second blocking air flow from one side of an outer opening of the moisture penetration prevention part towards the other side.

Further, it is preferable that the jetting pressure of the second air curtain part is set to be greater than the jetting pressure of the first air curtain part.

Further, it is preferable that the second air curtain part is configured to control at least one of the jetting angle and jetting pressure of the second blocking air flow.

Further, it is preferable that the local area dehumidification part further includes a humidity sensor installed in the opening, and at least one of the jetting angle and jetting amount of the blocking air flow is controlled according to a measurement value of the humidity sensor.

Further, it is preferable that a plurality of concave-convex parts extending in a direction intersecting the air flow direction are formed on the inner surface of the moisture penetration prevention part.

Further, it is preferable that a spiral concave-convex part extending in the air flow direction while rotating in a direction intersecting the air flow direction is formed on the inner surface of the moisture penetration prevention part.

Further, it is preferable that a jetting nozzle for jetting compressed air in a parallel direction with the rotation direction of the spiral concave-convex part is provided on an inner end of the moisture penetration prevention part.

Further, it is preferable that the moisture penetration prevention part is formed in a circular pipe shape.

Further, it is preferable that the pressure inside the local area dehumidification part is controlled to be greater than the pressure inside the main dehumidification part.

According to the present disclosure, a multi-stage dehumidification system for local area dehumidification of dry room is provided, where the inside of the dry room is divided into multi-stages for dehumidification such that only the necessary area may be locally controlled to have a humidity of less than 1%, and that is capable of effectively maintaining the relative humidity of the local area dehumidification part even when an opening of the local area dehumidification part is opened.

Further, a multi-stage dehumidification system for local area dehumidification of dry room is provided, that is capable of dehumidifying the inside of the dry room appropriately for each process, thereby reducing unnecessary control costs.

Further, a multi-stage dehumidification system for local area dehumidification of dry room is provided, where the area to be controlled to have a humidity of less than 1% is minimized, thereby enabling precise control.

Further, a multi-stage dehumidification system for local area dehumidification part of dry room is provided, that has a local area dehumidification part blocked from outside by multi-stages, with a relative humidity of less than 1%, thereby reducing rapid environmental changes when an operator enters and exits the room.

Further, a multi-stage dehumidification system for local area dehumidification of dry room is provided, that has a moisture penetration prevention part installed in the opening of the local area dehumidification part to inhibit moisture from outside from penetrating inside through the opening, and an improved moisture prevention function of the moisture penetration prevention part so that the extension length of the moisture penetration prevention part can be reduced, thereby minimizing the gap between the manufacturing facilities.

DETAILED DESCRIPTION

Figure 1:
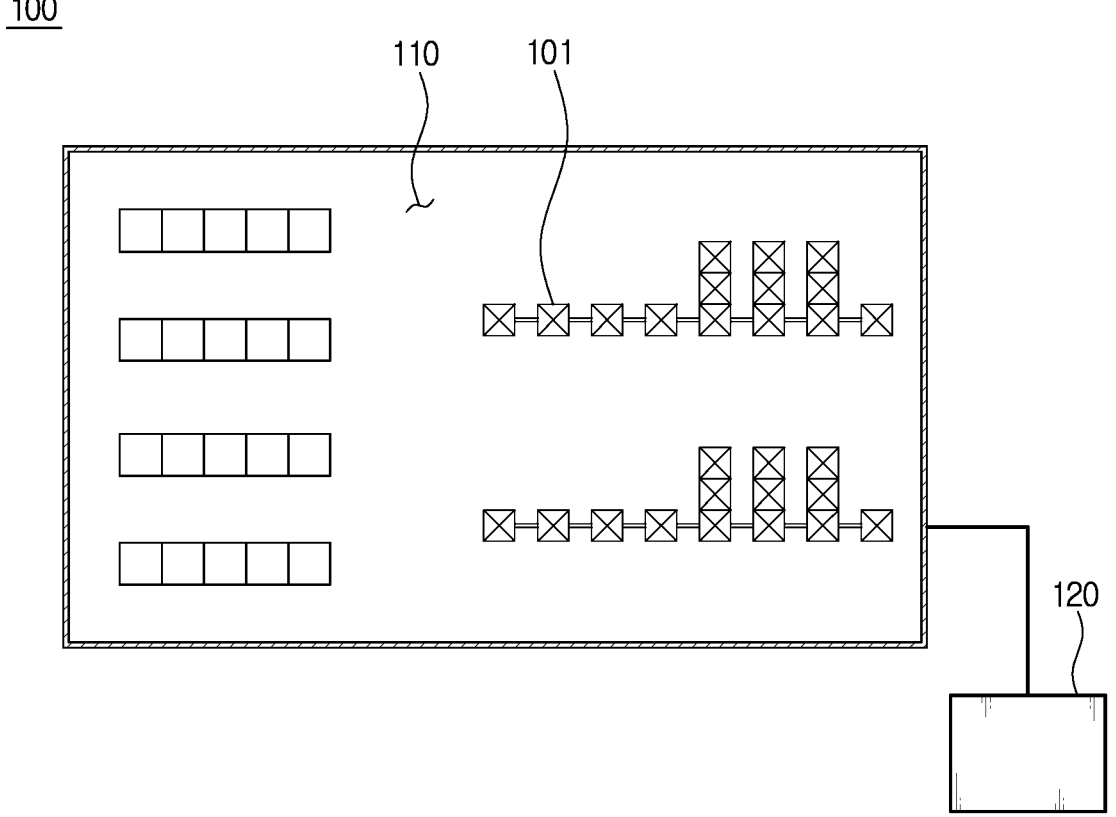
FIG. 1 is a schematic view of a conventional dry room.

Prior to the detailed description, in numerous embodiments, it is to be noted that regarding components having the same configuration, explanation will be made with reference to a first embodiment as a representative using the same reference numerals, and in the rest of the embodiments, explanation will be made regarding configurations that are different from the first embodiment.

Hereinbelow, with reference to the drawings attached, detailed explanation will be made on a multi-stage dehumidification system for local area dehumidification of dry room according to a first embodiment of the present disclosure.

Figure 2:
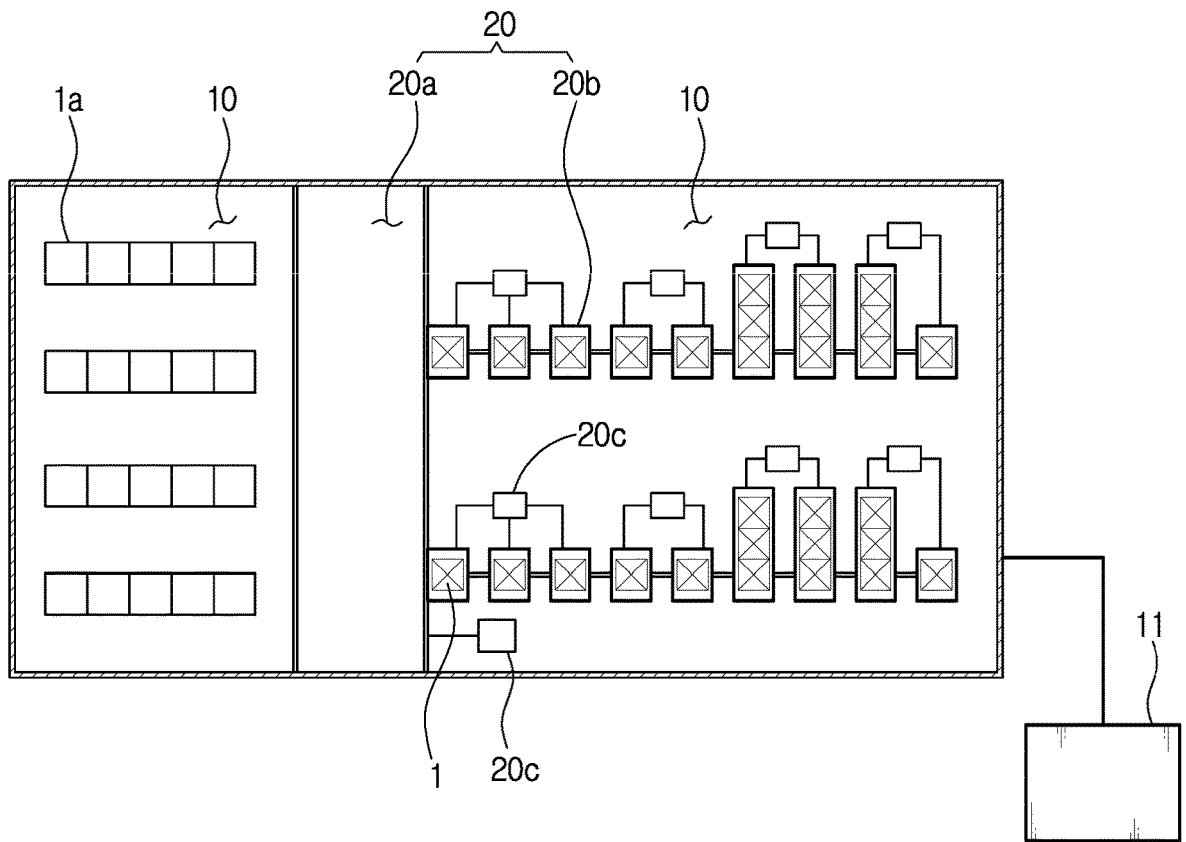
FIG. 2 is a schematic view of a multi-stage dehumidification system for local area dehumidification of dry room according to a first embodiment of the present disclosure.

FIG. 2 is a schematic view of a multi-stage dehumidifi-
cation system for local area dehumidification of dry room
according to the first embodiment of the present disclosure.

Referring to FIG. 2, the multi-stage dehumidification
system for local area dehumidification of dry room accord-
ing to the first embodiment of the present disclosure is
configured to include a main dehumidification part 10, a
main dehumidifying device 11, a local area dehumidification
part 20 and a local area dehumidifying device 20c.

The main dehumidification part 10 is formed to have a
space inside that is sealed from outside by panels, and a
certain opening/closing door 28 may be installed to enable
entry and exit of an operator.

It is preferable that the panel is made of a material that can
block the inside and outside to inhibit mutual moisture
penetration.

In the space inside the main dehumidification part 10,
numerous manufacturing facilities and the like for an elec-
trode process, an assembly process and a chemical conver-
sion process, for producing secondary batteries, may be
installed, and numerous manufacturing facilities 1a for the
electrode process and the chemical conversion process may
be installed inside the main dehumidification part 10, and
numerous manufacturing facilities 1 for the assembly pro-
cess may be installed inside the local area dehumidification
part 20.

The main dehumidifying device 11 controls the relative
humidity of the inside of the main dehumidification part 10
to be smaller than the relative humidity of the outside of the
main dehumidification part 10. Here, it is preferable to
control the relative humidity of the inside of the main
dehumidification part 10 to be greater than 2% and less than
or equal to 10%.

Further, the pressure inside the main dehumidification
part 10 is controlled to be greater than the pressure outside
the main dehumidification part 10. It is preferable to control
the pressure inside the main dehumidification part 10 to be
greater than the pressure outside (atmospheric pressure) the
main dehumidification part 10 by 0.3 mmAq to 0.7 mmA.

Here, the pressure inside the main dehumidification part
10 may be controlled through the main dehumidifying
device 11, or a separate pressure control unit may be
provided.

Figure 3:
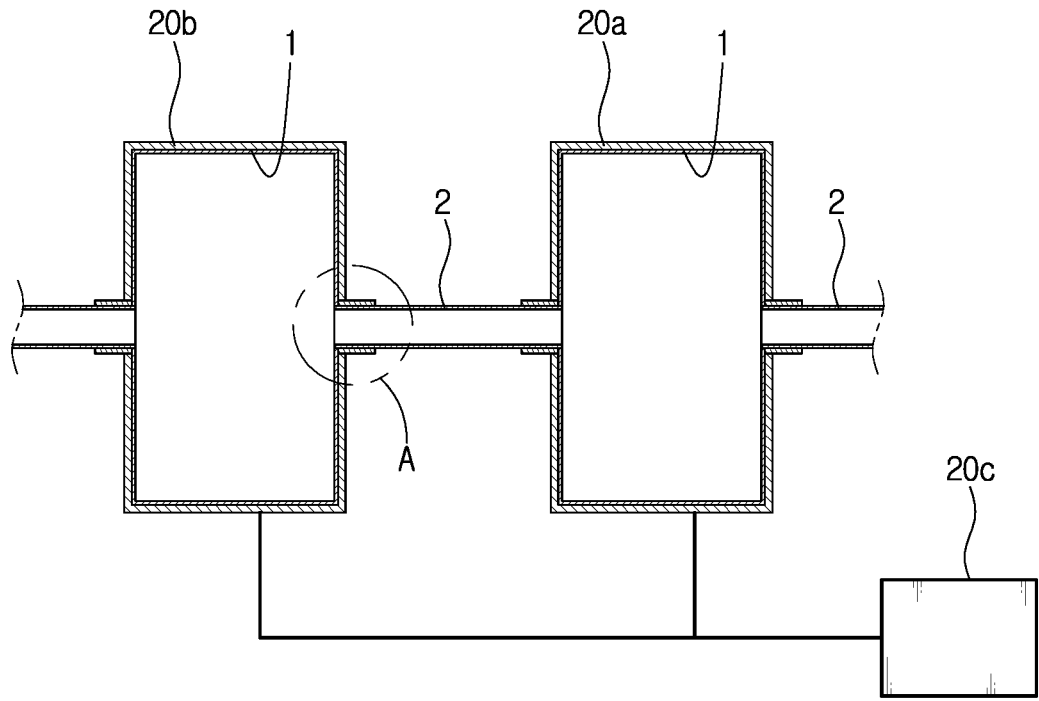
FIG. 3 is a detailed view of a local area dehumidification part and a local area dehumidifying device of FIG. 2.

FIG. 3 is a detailed view of the local area dehumidifica-
tion part 20 and the local area dehumidifying device 20c of
FIG. 2. Referring to FIGS. 2 and 3, the local area dehu-
midification part 20 is a space partitioned within the main
dehumidification part 10 by panels, and its inside space is
formed to be separated from the inside space of the main
dehumidification part 10 and sealed.

The panel is made of a material that can block the inside
and outside to inhibit mutual moisture penetration.

Numerous manufacturing facilities 1 for the assembly
process of a secondary battery are installed inside the local
area dehumidification part 20, and the local area dehumidi-
fication part 20 may be divided into a storage 20a for storing
rolls and the like, and an assembly facility part 20b.

The roll storage 20a is provided to store materials such as
rolls to be wound, and the roll storage 20a is separated and
partitioned within the main dehumidification part 10 by
panels, and its inside space may be controlled by the local
area dehumidifying device 20c to have a relative humidity of
less than 1%.

Inside the assembly facility part 20b, various manufac-
turing facilities 1 for carrying out a winding process, a lamination and depositing process, an electrode assembly
receiving process and an electrolyte injection process, are
individually installed.

Here, a conveyer 2 for transferring objects is connected
between each manufacturing facility 1, and in each local
area dehumidification part 20, an opening 21 is formed
through which the conveyer 2 passes for entry and exit of the
objects.

At an edge of the opening 21, a moisture penetration
prevention part 22 is formed in the shape of a sleeve
protruding to the outside.

Figure 4:
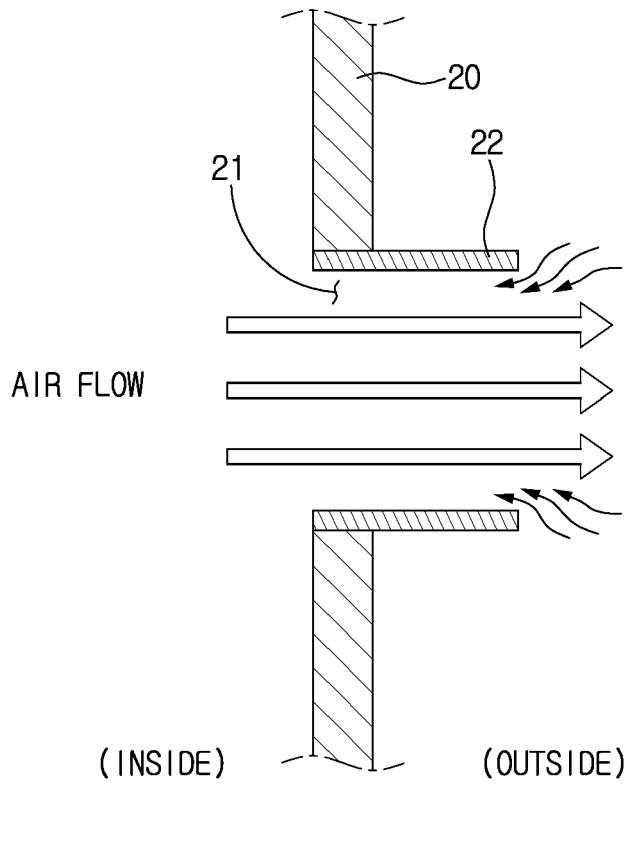
FIG. 4 is a view of moisture penetration in an opening having a moisture penetration prevention part.

That is, when the moisture penetration prevention part 22
is installed, as illustrated in FIG. 4, the moisture that
penetrates from an outer distal end of the moisture penetra-
tion prevention part 22 into the space inside the local area
dehumidification part 20 is pushed towards the space inside
the main dehumidification part 10 by the air flow formed
from the inside to outside of the local area dehumidification
part 20, and thus does not penetrate to the inside of the local
area dehumidification part 20.

Figure 5:
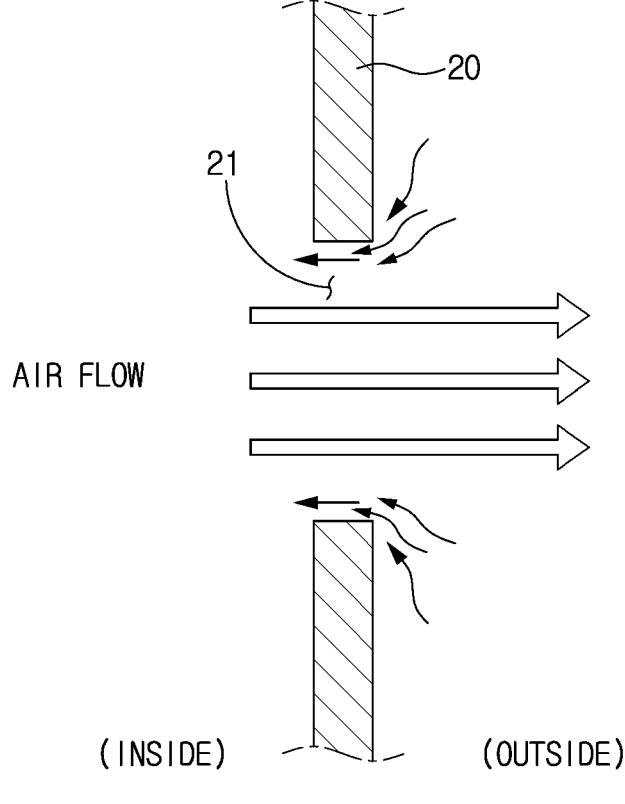
FIG. 5 is a view of moisture penetration in an opening not having a moisture penetration prevention part.

If the moisture penetration prevention part 22 is not
installed, as illustrated in FIG. 5, even when the pressure
inside the local area dehumidification part 20 is formed to be
greater than the pressure inside the main dehumidification
part 10, and thus the air flow is formed to face towards the
outside, the moisture penetrating from the edge of the
opening 21 cannot be blocked by air flow alone. Conse-
quently, the moisture penetration from outside through the
opening 21 can be blocked by the moisture penetration
prevention part 22.

Meanwhile, the local area dehumidifying device 20c
controls the humidity of the inside of the local area dehu-
midification part 20 to have a smaller relative humidity,
preferably less than 1%, than the relative humidity of the
inside of the main dehumidification part 10.

Further, the pressure inside the local area dehumidifica-
tion part 20 is controlled to be greater than the pressure
inside the main dehumidification part 10, preferably by 1.5
mmAq to 2.5 mmAq.

That is, by forming a pressure so that the air flow is
formed from the inside to outside of the local area dehu-
midification part 20, moisture is inhibited from penetrating
into the inside through the opening 21 of the local area
dehumidification part 20. Here, controlling the pressure
inside the local area dehumidification part 20 may be made
through the local area dehumidifying device 20c, or by a
separate control unit formed.

Consequently, for each of the numerous manufacturing
facility 1 for the assembly processes, the local area dehu-
midification part 20 may be individually formed, and by the
control through the local area dehumidifying device 20c, the
space inside each local area dehumidification part 20 may be
controlled to have a relative humidity of less than 1%.

Meanwhile, the length of the moisture penetration pre-
vention part 22 should be designed in proportion to the size
of the opening 21, and thus in order to minimize the gap
between the manufacturing facilities 1, the length of the
moisture penetration prevention part 22 should be designed
to be short.

Figure 6:
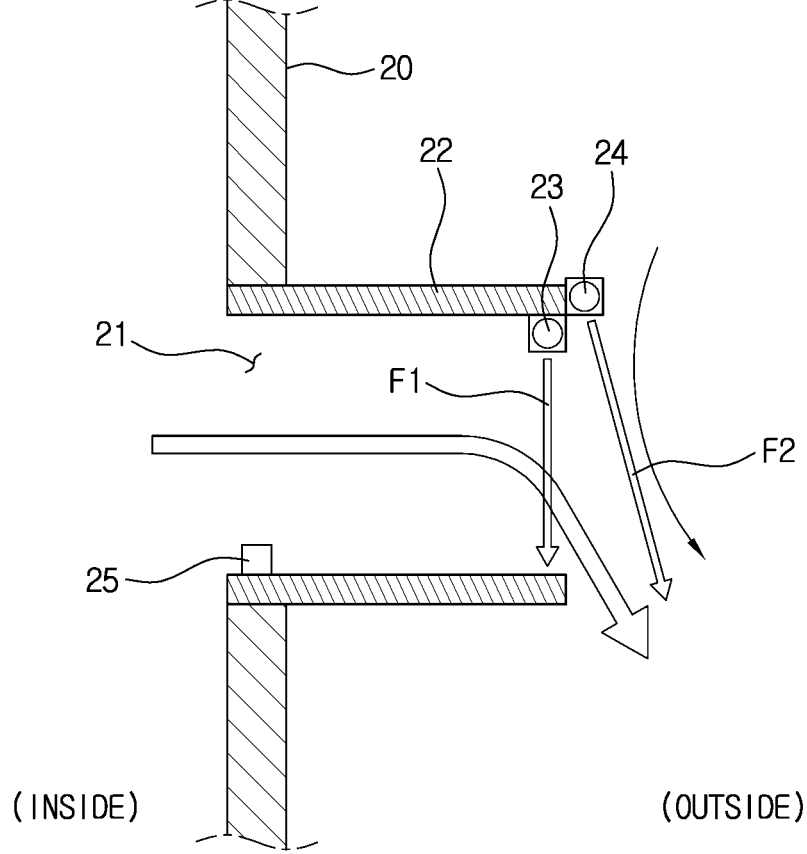
FIGS. 6 to 9 are views illustrating various embodiments of the moisture penetration prevention part.

For this purpose, in the present embodiment, as illustrated
in FIG. 6, the local area dehumidification part 20 may have
a first air curtain part 23 for forming a first blocking air flow
F1 from one side of an inner peripheral surface of the outer
end of the moisture penetration prevention part 22 towards
the other side, and a second air curtain part 24 that is
disposed close to the outside of the first air curtain part 23
and that forms a second blocking air flow F2 from one side of the outer end of the moisture penetration prevention part 22 towards the other side, and through the opening 21, moisture can be effectively inhibited from penetrating into the inside of the local area dehumidification part 20, and thus the length of the moisture penetration prevention part 22 may be minimized.

Specifically, as the first air curtain part 23 forms the first blocking air flow F1 from one side of the opening at the exhaust side of the moisture penetration prevention part 22 towards the other side, moisture of the outside air can be inhibited from penetrating into the inside of the local area dehumidification part 20 through the opening at the exhaust side of the moisture penetration prevention part 22.

Here, the fluid jet through the first air curtain part 23 may be provided as compressed air with a relative humidity of less than 1%, and since the first air curtain part 23 is installed on an inner peripheral surface of a distal end of the moisture penetration prevention part 22, it is possible to minimize the inflow of outside air into the first blocking air flow F1.

Meanwhile, the first blocking air flow F1 formed by the first air curtain part 23 is diffused from the inner peripheral surface at the other side of the moisture penetration prevention part 22, and since of the inside area of the moisture penetration prevention part 22, the velocity of the air flow of the edge area is lower than the velocity of the air flow of the middle area, when outside air flows into the first blocking air flow F1, there is a concern that the moisture in the outside air may penetrate into the inside space of the local area dehumidification part 20 through the edge area at the other side of the moisture penetration prevention part 22 together with the diffused air flow.

The second air curtain part 24 is disposed close to the outside of the first air curtain part 23, and forms the second blocking air flow F2 from one side of the opening at the exhaust side of the moisture penetration prevention part 22 towards the other side, thereby inhibiting the outside air from flowing into the first blocking air flow F1. Here, it is preferable that the jetting pressure of the second air curtain part 24 is set to be relatively greater than the jetting pressure of the first air curtain part 23, and that the surface area of the second blocking air flow F2 is set to be greater than the surface area of the first blocking air flow F1.

Meanwhile, the opening 21 of the local area dehumidification part 20 may be provided with a humidity sensor 25 for measuring humidity, and the second air curtain part 24 may be configured to control the jetting angle and jetting pressure of the second blocking air flow F2 according to the measurement value measured in the humidity sensor 25.

For example, when the second blocking air flow F2 of the second air curtain part 24 is set in a vertical direction, outside air can be effectively inhibited from flowing into the first blocking air flow F1, but the air of the local area dehumidification part 20 being exhausted through the moisture penetration prevention part 22 by the second blocking air flow F2 may mix with the first blocking air flow F1 within the moisture penetration prevention part 22, and thus a smooth exhaust air flow may not be formed, and here, if the outside air flows into the first blocking air flow F1, outside moisture penetrates into the inside of the local area dehumidification part 20 by the turbulence formed in the moisture penetration prevention part 22.

Further, when the second blocking air flow F2 of the second air curtain part 24 is inclined downward in the exhaust air flow direction, the air of the local area dehumidification part 20 being exhausted through the moisture penetration prevention part 22 can be exhausted smoothly, but as the angle between the first blocking air flow F1 and the second blocking air flow F2 increases, the possibility that outside air may flow into the first blocking air flow F1 increases.

Therefore, it is possible to measure the humidity through the humidity sensor 25 disposed in the opening 21, and control the jetting angle and jetting pressure of the second air curtain part 24 according to the measured value, to inhibit the outside air from flowing into the first blocking air flow F1, while the air being exhausted through the moisture penetration prevention part 22 form a smooth exhaust air flow.

Figure 7:
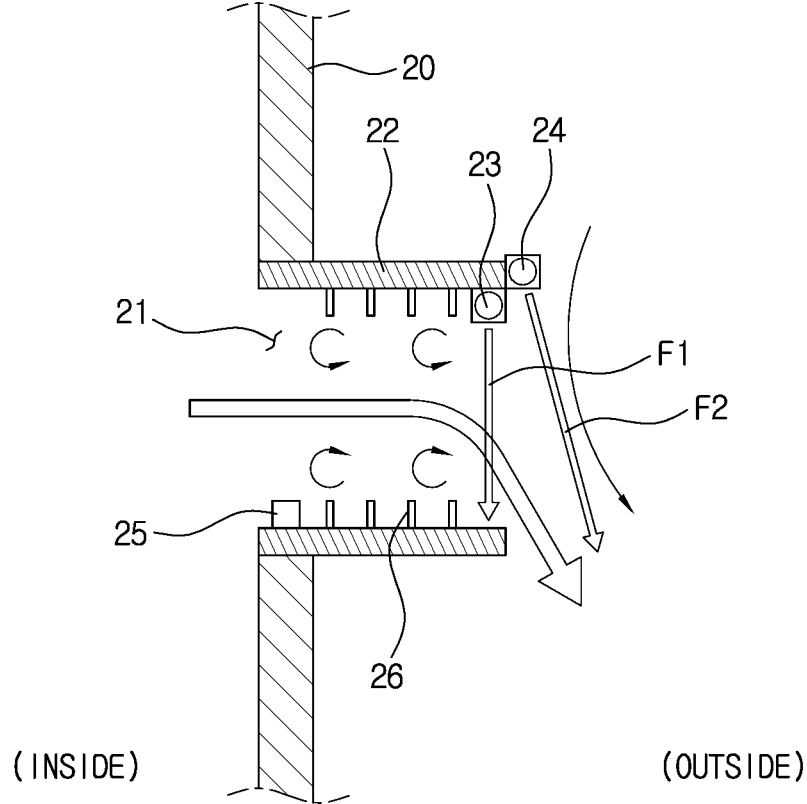

In addition, in the present embodiment, as illustrated in FIG. 7, it is possible to form a plurality of concave-convex parts 26 extending in a direction intersecting the air flow direction on the inner surface of the moisture penetration prevention part 22, thereby forming an air flow that rotates according to the air flow in the edge area of the inside area of the moisture penetration prevention part 22. Thus, since it is possible to effectively inhibit moisture from penetrating into the inside through the edge area where the velocity of the air flow is lower than the velocity of the air flow of the middle area, the length of the moisture penetration prevention part 22 can be shortened.

Figure 8:
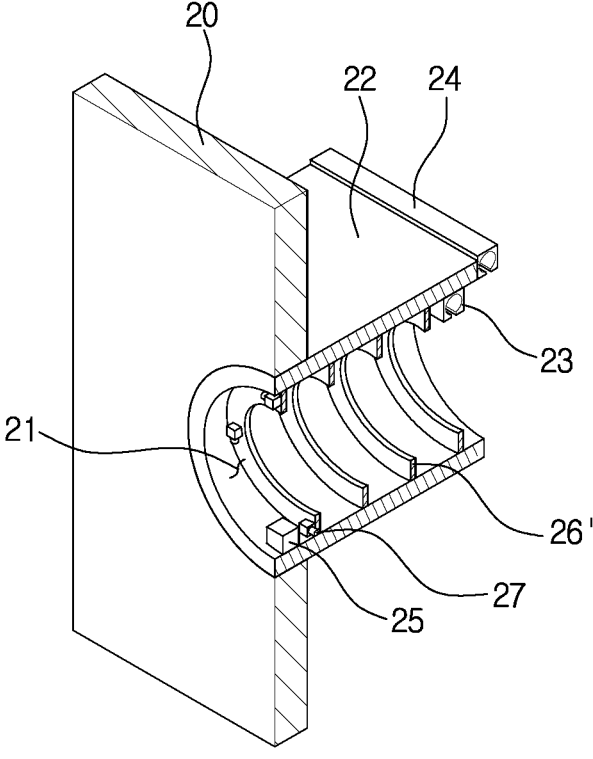
Figure 9:
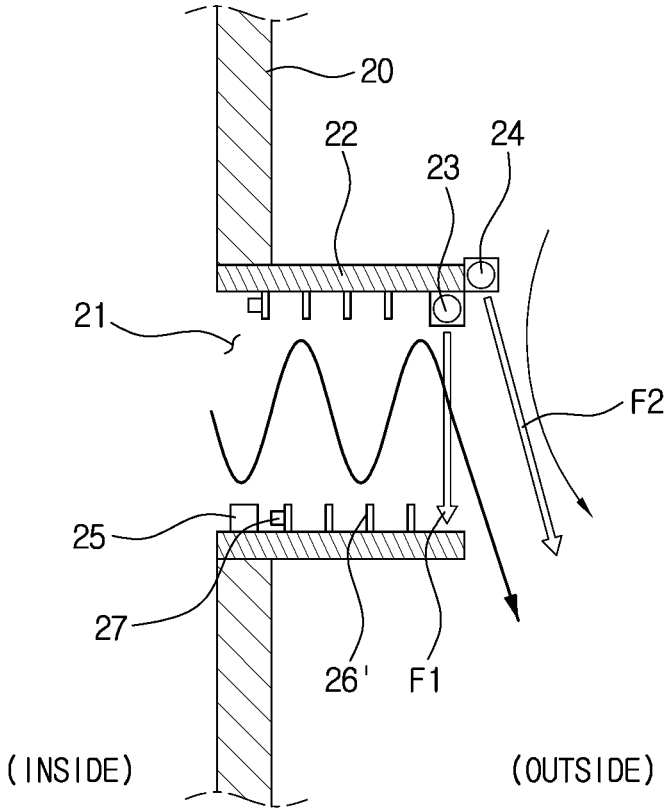

In addition, as illustrated in FIGS. 8 and 9, when the moisture penetration prevention part 22 is configured in a circular pipe shape, and a spiral concave-convex part 26' is formed on the inner surface of the moisture penetration prevention part 22 to extend along the air flow direction while rotating in a direction intersecting the air flow direction, the air being exhausted through the moisture penetration prevention part 22 forms an air flow (spiral fluid flow) that is swirled as a whole by the spiral concave-convex part 26'. Also in this case, a smooth exhaust air flow can be formed in the edge area inside the moisture penetration prevention part 22, and thus moisture can be inhibited from penetrating through the edge area inside the moisture penetration prevention part 22, thereby shortening the length of the moisture penetration prevention part 22.

Also, when a jet nozzle 27 for jetting compressed air in the rotation direction of the spiral concave-convex part 26' is disposed inside the inlet side of the moisture penetration prevention part 22, the swirling effect of the air being exhausted through the moisture penetration prevention part 22 can be increased, thereby further shortening the length of the moisture penetration prevention part 22.

Figure 10:
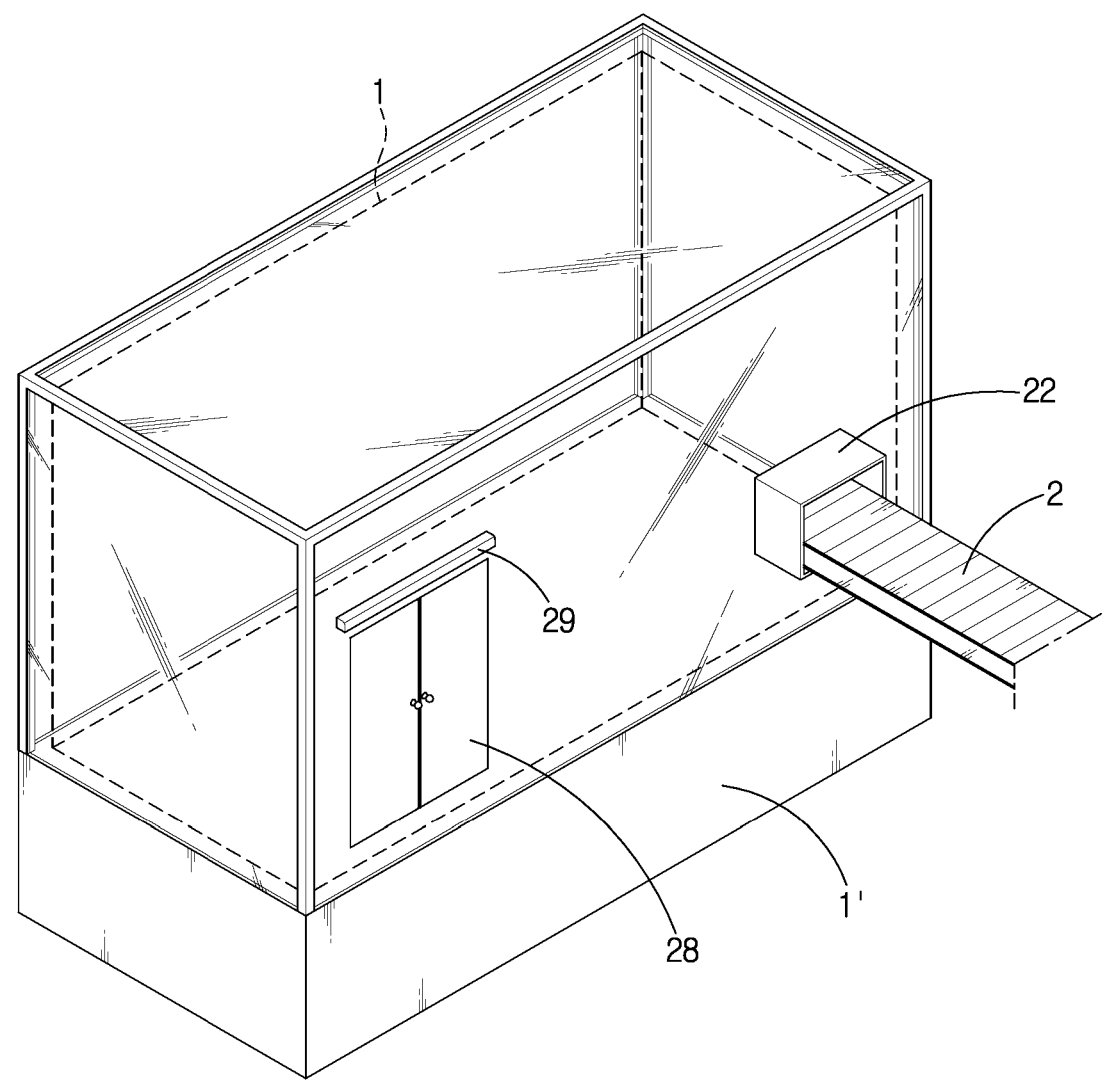
FIG. 10 is a perspective view of the local area dehumidification part of FIG. 2.
Figure 11:
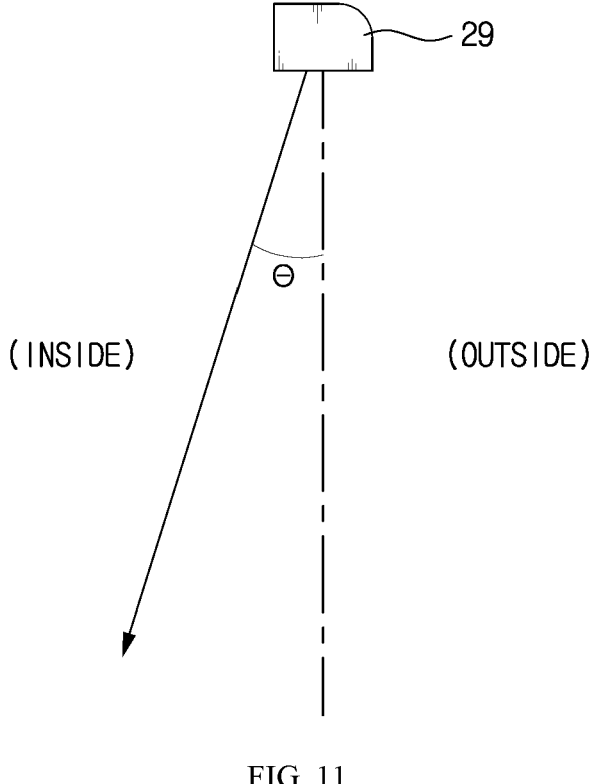
FIG. 11 is a schematic view of an air flow blocking part of FIG. 10.

FIG. 10 is a perspective view of the local area dehumidification part of FIG. 2, and FIG. 11 is a schematic view of the air flow blocking part of FIG. 10. Referring to FIGS. 10 and 11, an opening/closing door 28 is installed in the local area dehumidification part 20, and in an adjacent area of the opening/closing door 28, an air flow blocking part 29 is installed.

According to the illustrations, the local area dehumidification part 20 is installed to be in contact with a housing 1' of the manufacturing facility 1, and the air flow blocking part 29 is installed at an upper end of the opening/closing door 28.

When the opening/closing door 28 is opened, the air flow blocking part 29 blocks air flow between the main dehumidification part 10 and the local area dehumidification part 20.

For this purpose, the air flow blocking part 29 jets the fluid inner downwards of the local area dehumidification part 20, and here the jetting angle θ is 10 to 20 degrees based on the vertical direction, and the jetting velocity may be 15 m/s to 40 m/s.

The fluid being jet from the air flow blocking part 29 may be provided as compressed air having a relative humidity of less than 1%.

Since the pressure inside the local area dehumidification part 20 is higher than the pressure outside the local area dehumidification part 20, an air flow is formed from inside the local area dehumidification part 20 to the outside, and here, as the fluid is jet inner downwards of the air flow blocking part 29, some kind of barrier film is formed.

If the jetting direction of the air flow blocking part 29 is formed outer downwards, it may act together with the air flow facing from inside to outside, and in the area adjacent to the opening/closing door 28, outside moisture may penetrate.

Through the jetting angle and the jetting velocity of the air flow blocking part 29, it is possible to inhibit the penetration of outside moisture through the opening/closing door 28 when the opening/closing door 28 is opened.

That is, the air flow blocking part 29 can block the moisture between the inside and outside of the local area dehumidification part 20 together with the moisture penetration prevention part 22 as described above, even where the inside and outside of the local area dehumidification part 20 are opened, thereby controlling the humidity inside the local area dehumidification part 20 with further precision.

Using the multi-stage dehumidification system for local area dehumidification of dry room according to the present disclosure, it is only necessary to control the local area that requires a relative humidity of less than 1%, and thus it is possible to save the control cost compared to prior art systems that used to control also the unnecessary areas to have a relative humidity of less than 1%.

Further, by forming the local area dehumidification part 20 having a relative humidity of less than 1% that is blocked from outside by multi-stages, it is possible to reduce radical environmental changes when an operator enters and exits the room.

The right of scope of the present disclosure is not limited to the embodiments described above, but may be implemented in various forms of embodiments within the scope of the claims attached hereto. Without departing from the gist of the present disclosure claimed in the claims, it is considered to be within the scope of the claims of the present disclosure to various extents that can be modified by any person skilled in the art to which the invention pertains

REFERENCE NUMERALS

10: MAIN DEHUMIDIFICATION PART, 11: MAIN DEHUMIDIFYING DEVICE, 20: LOCAL AREA DEHUMIDIFICATION PART, 20A: STORAGE, 20B: ASSEMBLY FACILITY PART, 20C: LOCAL AREA DEHUMIDIFYING DEVICE, 21: OPENING, 22: MOISTURE PENETRATION PREVENTION PART, 23: FIRST AIR CURTAIN PART, 24: SECOND AIR CURTAIN PART, 25: HUMIDITY SENSOR, 26: CONCAVE-CONVEX PART, 26': SPIRAL CONCAVE-CONVEX PART, 27: JETTING NOZZLE, 28: OPENING/CLOSING DOOR, 29: AIR FLOW BLOCKING PART

What is claimed is:

1. A multi-stage dehumidification system for local area dehumidification of a dry room, the system comprising:
   a main dehumidification part formed to have an inside space that is sealed from outside;
   a main dehumidifying device for controlling a relative humidity of the inside space of the main dehumidification part to be less than a relative humidity of an outside of the main dehumidification part;
   at least one local area dehumidification part that is partitioned within the main dehumidification part, and that has an inside space that is sealed from the main dehumidification part; and
   a local area dehumidifying device for controlling a relative humidity of the inside space of the local area dehumidification part to be smaller than the relative humidity of the inside of the main dehumidification part,
   wherein the local area dehumidification part comprises an opening for entry and exit of objects; a moisture penetration prevention part that protrudes to outside from an edge of the opening; and a first air curtain part that forms a first blocking air flow from one side of an outer opening of the moisture penetration prevention part towards another side,
   wherein the local area dehumidification part further comprises a second air curtain part that is disposed close to outside of the first air curtain part and that forms a second blocking air flow from the one side of an outer opening of the moisture penetration prevention part towards the other side,
   wherein the second air curtain part is configured to control at least one of a jetting angle and a jetting pressure of the second blocking air flow,
   wherein the first air curtain part and the second air curtain part are positioned and configured such that a jetting pressure of the second air curtain part is greater than a jetting pressure of the first air curtain part and a surface area of the second blocking air flow is greater than a surface area of the first blocking air flow, thereby inhibiting moisture of outside air from flowing into the inner space of the local area dehumidification part through an edge area at the other side of the outer opening of the moisture penetration prevention part,
   wherein the second blocking air flow of the second air curtain part is configured, by way of a position of the second air curtain part and by way of the second blocking air flow of the second air curtain part being inclined downward in an exhaust air flow direction to exhaust air of the local area dehumidification part smoothly,
   wherein the local area dehumidification part further comprises a humidity sensor installed in the opening, and at least one of the jetting angle and the jetting pressure of the second blocking air flow is controlled according to a measurement value of the humidity sensor to prevent or inhibit outside air from flowing into the first blocking air flow,
   wherein a spiral concave-convex part extending in an air flow direction while rotating in a direction intersecting the air flow direction is formed on an inner surface of the moisture penetration prevention part, and
   wherein a jetting nozzle for jetting compressed air in a parallel direction with the rotation direction of the spiral concave-convex part is provided on an inner end of the moisture penetration prevention part.

2. The multi-stage dehumidification system for local area dehumidification of a dry room according to claim 1, wherein a plurality of concave-convex parts extending in a direction intersecting an air flow direction are formed on an inner surface of the moisture penetration prevention part.

3. The multi-stage dehumidification system for local area dehumidification of a dry room according to claim 2, wherein a pressure inside the local area dehumidification part is controlled to be greater than a pressure inside the main dehumidification part.

4. The multi-stage dehumidification system for local area dehumidification of a dry room according to claim 1, wherein the moisture penetration prevention part is formed in a circular pipe shape.

5. The multi-stage dehumidification system for local area dehumidification of a dry room according to claim 4, wherein a pressure inside the local area dehumidification part is controlled to be greater than a pressure inside the main dehumidification part.

6. The multi-stage dehumidification system for local area dehumidification of a dry room according to claim 1, wherein a pressure inside the local area dehumidification part is controlled to be greater than a pressure inside the main dehumidification part.

\* \* \* \* \*